United States Patent
Kacik et al.

(10) Patent No.: US 8,752,575 B2
(45) Date of Patent: Jun. 17, 2014

(54) FAUCET INCLUDING CARTRIDGE ASSEMBLY WITH RADIALLY OFFSET KEY

(75) Inventors: Mark S. Kacik, Lakewood, OH (US);
Yaakov Korb, Graafton, OH (US);
Sanjeev S. Moghe, Chagrin Falls, OH (US)

(73) Assignee: Moen Incorporated, North Olmsted, OH (US)

( * ) Notice: Subject to any disclaimer, the term of this patent is extended or adjusted under 35 U.S.C. 154(b) by 143 days.

(21) Appl. No.: 13/551,188

(22) Filed: Jul. 17, 2012

(65) Prior Publication Data

US 2014/0020777 A1    Jan. 23, 2014

(51) Int. Cl.
*F16K 25/00* (2006.01)
*F16K 51/00* (2006.01)
*F16K 11/078* (2006.01)

(52) U.S. Cl.
USPC ..................... 137/454.6; 137/625.4

(58) Field of Classification Search
USPC .................. 137/625.4, 625.17, 454.6; 4/677; 403/355–356
See application file for complete search history.

(56) References Cited

U.S. PATENT DOCUMENTS

| | | |
|---|---|---|
| 3,548,875 A | 12/1970 | Lagarelli |
| 3,680,592 A | 8/1972 | Hayman |
| 3,698,418 A | 10/1972 | Schmitt |
| 3,788,356 A | 1/1974 | Moen |
| 3,799,191 A | 3/1974 | Burkhardt et al. |
| 4,109,672 A | 8/1978 | Szemeredi |
| 4,226,260 A | 10/1980 | Schmitt |
| 4,305,419 A | 12/1981 | Moen |
| 4,606,372 A | 8/1986 | Hayman |
| 4,700,736 A | 10/1987 | Sheen |
| 4,838,304 A | 6/1989 | Knapp |
| 4,901,749 A | 2/1990 | Hutto |
| 5,402,827 A * | 4/1995 | Gonzalez ................. 137/625.17 |
| 5,613,521 A | 3/1997 | Knapp |
| 5,664,603 A | 9/1997 | Knapp |
| 6,135,151 A * | 10/2000 | Bowers et al. ........... 137/625.17 |
| 6,431,211 B1 | 8/2002 | Wang |
| 7,063,098 B2 | 6/2006 | Sprague |
| 7,175,158 B2 | 2/2007 | Thomas |
| 7,185,676 B2 | 3/2007 | Huang |
| 7,240,850 B2 | 7/2007 | Beck et al. |
| 7,337,804 B2 | 3/2008 | Rosko |
| 7,357,145 B2 | 4/2008 | Soderberg |
| 7,461,669 B2 | 12/2008 | Jonte et al. |
| D585,522 S | 1/2009 | Geideman et al. |
| 7,549,437 B2 | 6/2009 | Hanada |
| D620,081 S | 7/2010 | Geideman et al. |
| D633,179 S | 2/2011 | Geideman et al. |

(Continued)

FOREIGN PATENT DOCUMENTS

DE    3720207 A1    12/1987

OTHER PUBLICATIONS

International Search Report for International App. No. PCT/US2013/050486 dated Jan. 9, 2014 (2 pages).

(Continued)

*Primary Examiner* — John Fox
*Assistant Examiner* — Michael R Reid
(74) *Attorney, Agent, or Firm* — Calfee, Halter & Griswold LLP

(57) ABSTRACT

The present invention provides a faucet including a cartridge assembly with a radially offset key.

20 Claims, 6 Drawing Sheets

(56) References Cited

U.S. PATENT DOCUMENTS

| | | |
|---|---|---|
| 8,056,578 B2 | 11/2011 | Lopp et al. |
| 8,109,293 B2 | 2/2012 | Tucker |
| 8,109,294 B2 | 2/2012 | Kacik et al. |
| 8,156,963 B2 | 4/2012 | Lopp et al. |
| 2006/0037651 A1 | 2/2006 | Yang |
| 2007/0163446 A1 | 7/2007 | Halliday et al. |
| 2007/0277889 A1 | 12/2007 | Rosko |
| 2008/0178951 A1 | 7/2008 | Frackowiak et al. |
| 2009/0025808 A1* | 1/2009 | Kacik et al. .................. 137/625 |
| 2009/0026402 A1 | 1/2009 | Loschelder et al. |
| 2010/0127202 A1 | 5/2010 | Bors et al. |
| 2012/0025122 A1 | 2/2012 | Lopp et al. |

OTHER PUBLICATIONS

Written Opinion of the International Searching Authority for International App. No. PCT/US2013/050486 dated Jan. 9, 2014 (7 pages).

* cited by examiner

FAUCET INCLUDING CARTRIDGE ASSEMBLY WITH RADIALLY OFFSET KEY

FIELD

The present invention relates generally to a faucet including a cartridge assembly, and, more particularly, to a faucet including a cartridge assembly with a radially offset key.

BACKGROUND

In faucets, cartridge assemblies are installed in valve bodies. Rotation of a cartridge assembly within a valve body can damage the faucet and even render the faucet inoperable. In order to resist rotation of the cartridge assembly within the valve body, the cartridge assembly can include a key and the valve body can include a corresponding keyway. Prior keys and keyways include a center line that intersects a central longitudinal axis of the cartridge assembly.

SUMMARY

The present invention provides a faucet including a cartridge assembly with a radially offset key. In an exemplary embodiment, the faucet includes a cartridge shell. The cartridge shell includes a first end and a second end. The cartridge shell has an exterior surface. The cartridge shell has an interior with a central longitudinal axis extending through a center of the interior from the first end to the second end. The faucet includes a key extending from the exterior surface of the cartridge shell. The key has an inner side and an outer side. The inner side and the outer side of the key lie in a plane through the first end of the cartridge shell that is perpendicular to the central longitudinal axis of the cartridge shell. The key has a center line extending through a center of the inner side of the key and through a center of the outer side of the key. The center line of the key does not intersect the central longitudinal axis of the cartridge shell.

In another exemplary embodiment, the faucet includes a cartridge shell. The cartridge shell includes a first end and a second end. The cartridge shell has an exterior surface. The cartridge shell has an interior with a central longitudinal axis extending through a center of the interior from the first end to the second end. The faucet includes a pair of keys extending from the exterior surface of the cartridge shell. Each key has an inner side and an outer side. The inner side and the outer side of each key lie in a plane through the first end of the cartridge shell that is perpendicular to the central longitudinal axis of the cartridge shell. Each key has a center line extending through a center of the inner side of the key and through a center of the outer side of each key. The center line of each key does not intersect the central longitudinal axis of the cartridge shell.

In another exemplary embodiment, the faucet includes a cartridge shell. The cartridge shell includes a first end and a second end. The cartridge shell has an exterior surface. The cartridge shell has an interior with a central longitudinal axis extending through a center of the interior from the first end to the second end. The faucet includes a first pair of keys extending from the exterior surface of the cartridge shell. The first pair keys are diametrically opposed to each other. Each of the first pair of keys has an inner side and an outer side. The inner side and the outer side of each first pair key lie in a plane through the first end of the cartridge shell that is perpendicular to the central longitudinal axis of the cartridge shell. Each first pair key has a center line extending through a center of the inner side of the key and through a center of the outer side of key. The center line of one of the first pair of keys is common with the center line of another of the first pair of keys. The faucet includes a second pair of keys extending from the exterior surface of the cartridge shell. The second pair keys are diametrically opposed to each other. Each of the second pair of keys has an inner side and an outer side. The inner side and the outer side of each second pair key lie in a plane through the first end of the cartridge shell that is perpendicular to the central longitudinal axis of the cartridge shell. Each second pair key has a center line extending through a center of the inner side of the key and through a center of the outer side of key. The center line of one of the second pair of keys is common with the center line of another of the second pair of keys. The first pair keys are diametrically opposed to the second pair keys. The center line of the first pair of keys is parallel to the center line of the second pair of keys. The center line of the first pair of keys does not intersect the central longitudinal axis of the cartridge shell. The center line of the second pair of keys does not intersect the central longitudinal axis of the cartridge shell.

DETAILED DESCRIPTION

The present invention provides a faucet including a cartridge assembly with a radially offset key. An exemplary embodiment of a cartridge assembly 10 of the present invention is shown in FIGS. 1-6.

Figure 1:
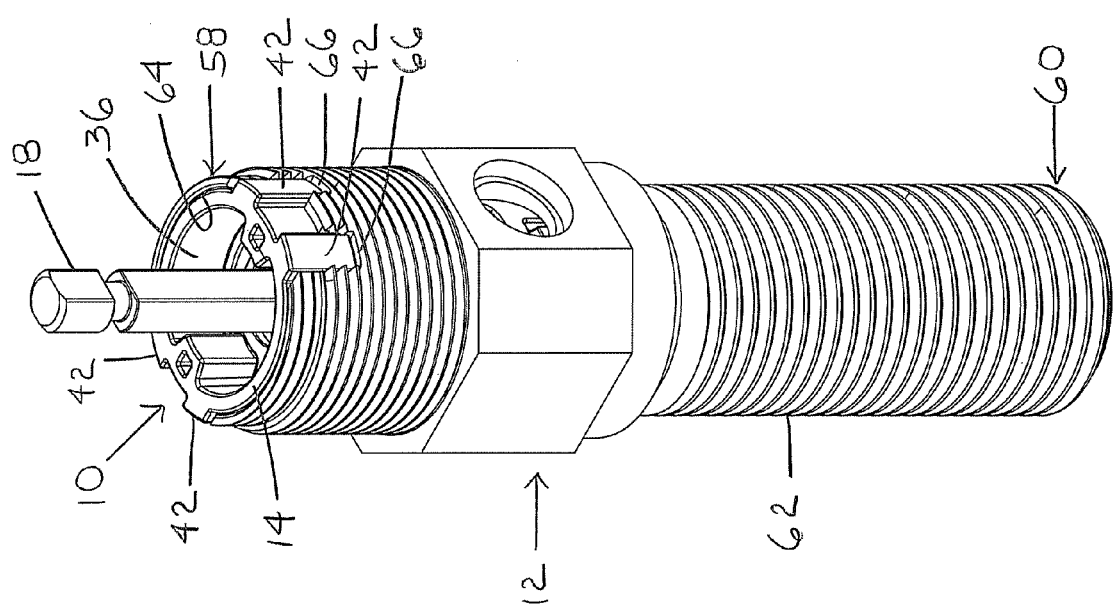
FIG. 1 is a perspective view of a cartridge assembly installed in a valve body according to an exemplary embodiment of the present invention.
Figure 2:
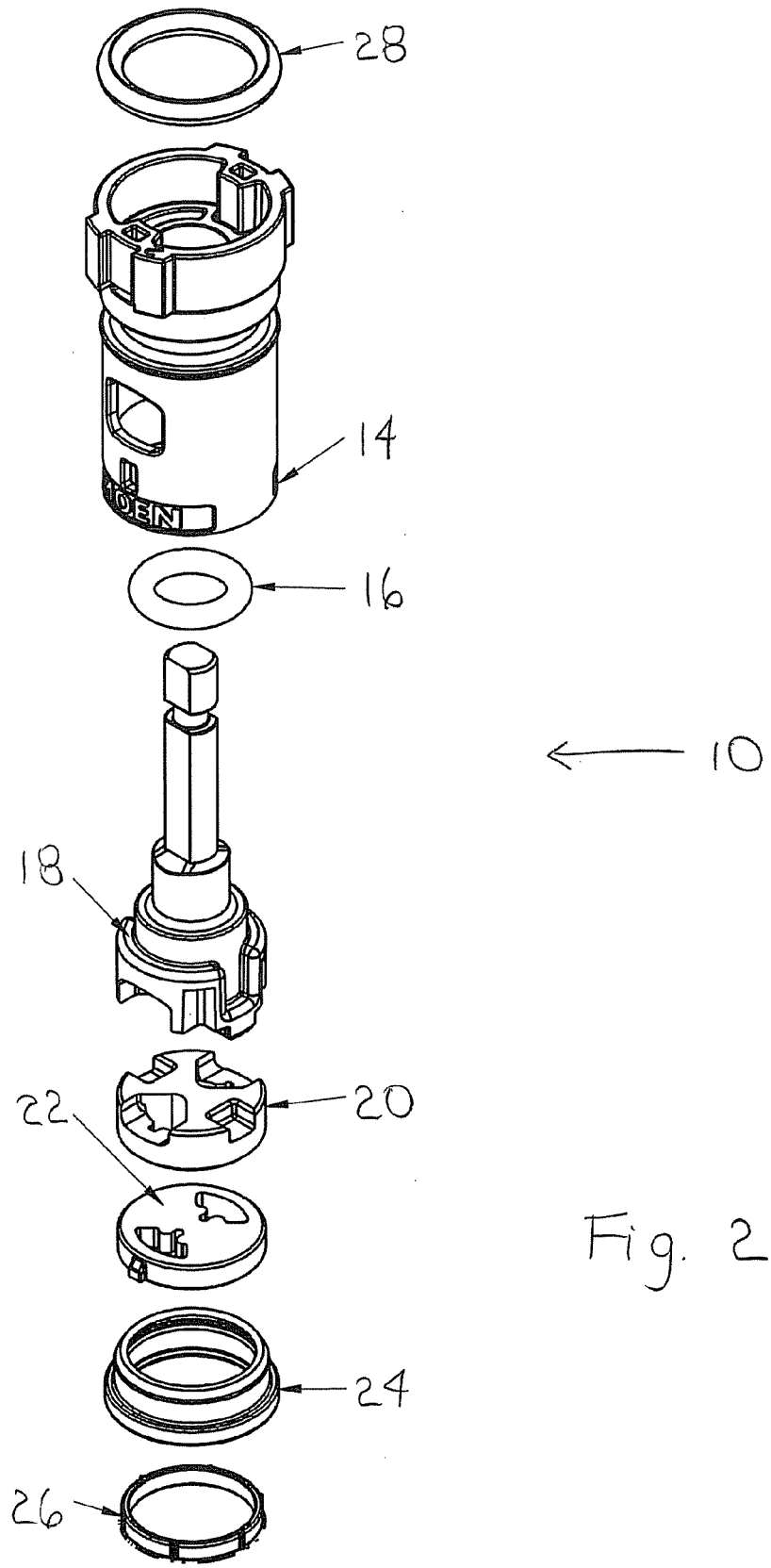
FIG. 2 is an exploded perspective view of the cartridge assembly of FIG. 1.

In an exemplary embodiment, as illustrated in FIG. 1, the cartridge assembly 10 is installed in a valve body 12. In an exemplary embodiment, as illustrated in FIGS. 2-6, the cartridge assembly 10 includes a cartridge shell 14, a stem seal 16, a stem 18, a moveable disk 20, a fixed disk 22, a base seal 24, a base seal support 26, and a shell seal 28. Cartridge assemblies and valve bodies are well-known in the art and, therefore, only the relevant components of the cartridge assembly 10 and the valve body 12 will be described in greater detail.

Figure 5:
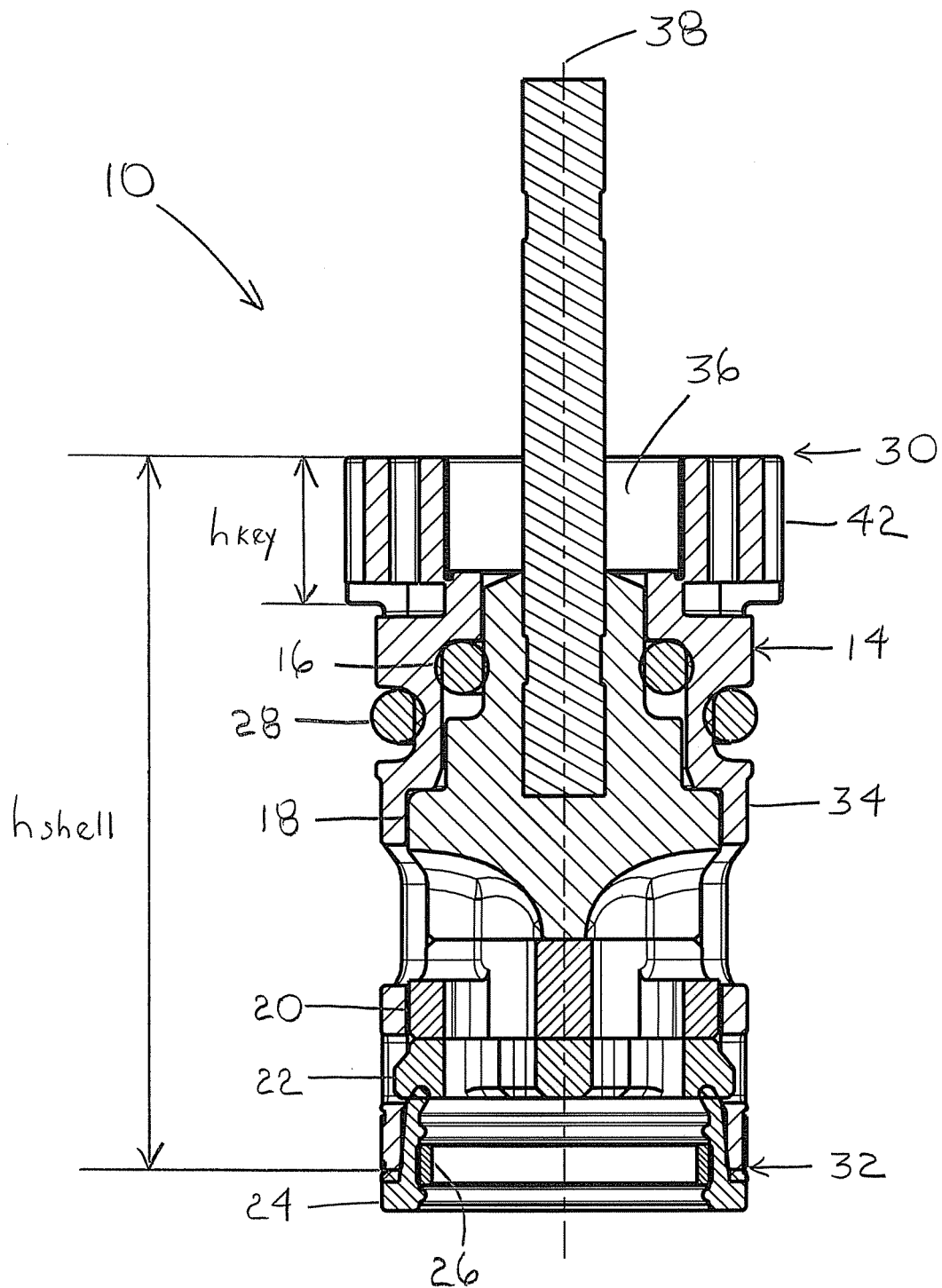
FIG. 5 is a cross-sectional view of the cartridge assembly of FIG. 2 along the line A-A in FIG. 3.
Figure 6:
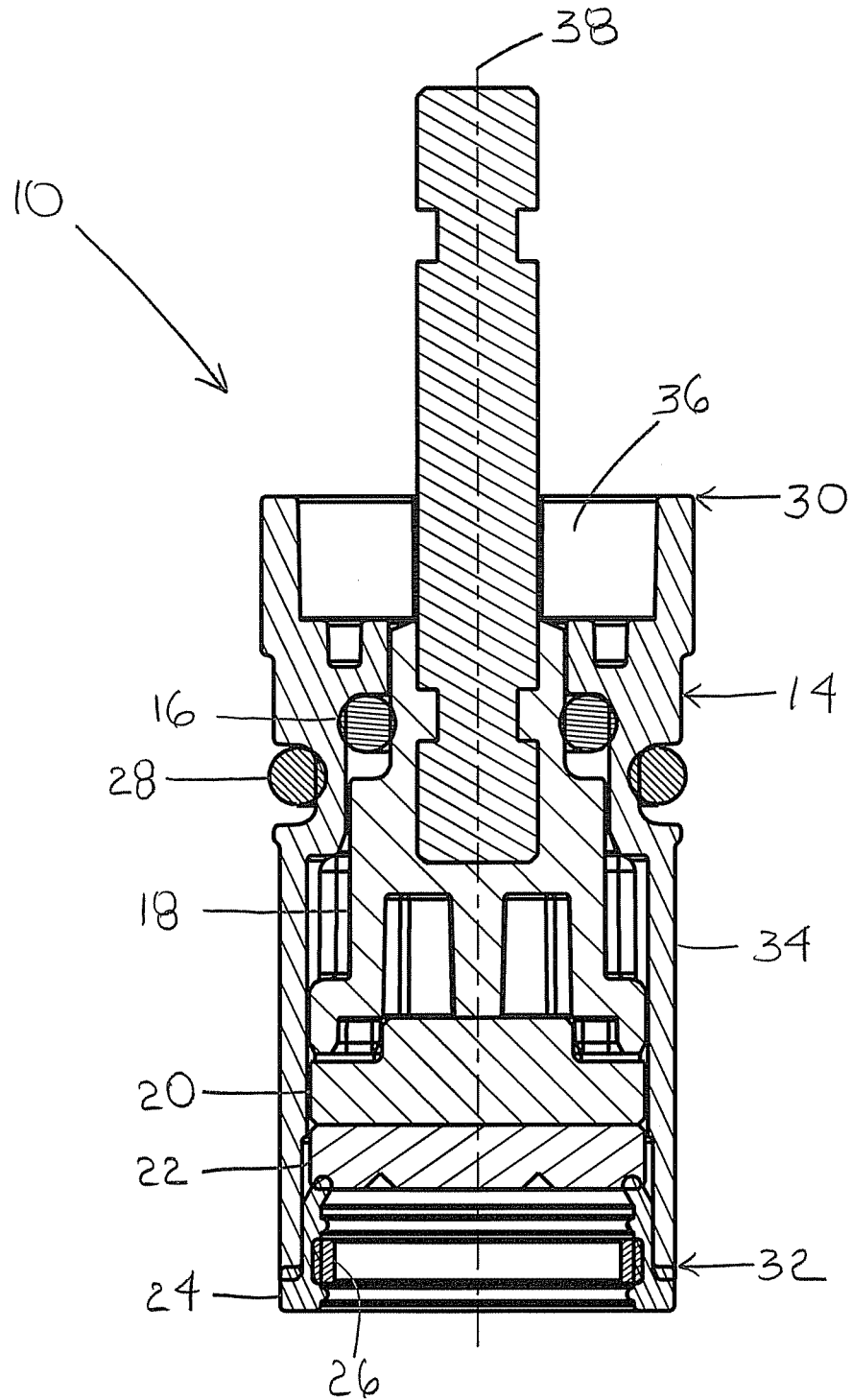
FIG. 6 is a cross-sectional view of the cartridge assembly of FIG. 2 along the line B-B in FIG. 3.

In the illustrated embodiment, as best shown in FIGS. 5 and 6, the cartridge shell 14 includes a first end 30 and a second end 32. The cartridge shell 14 has an exterior surface 34 with a generally cylindrical shape. The cartridge shell 14 has an interior 36 with a central longitudinal axis 38 extending through a center 40 of the interior 36 from the first end 30 to the second end 32. The cartridge shell 14 can be formed of plastic, metal, or any other suitable material.

Figure 3:
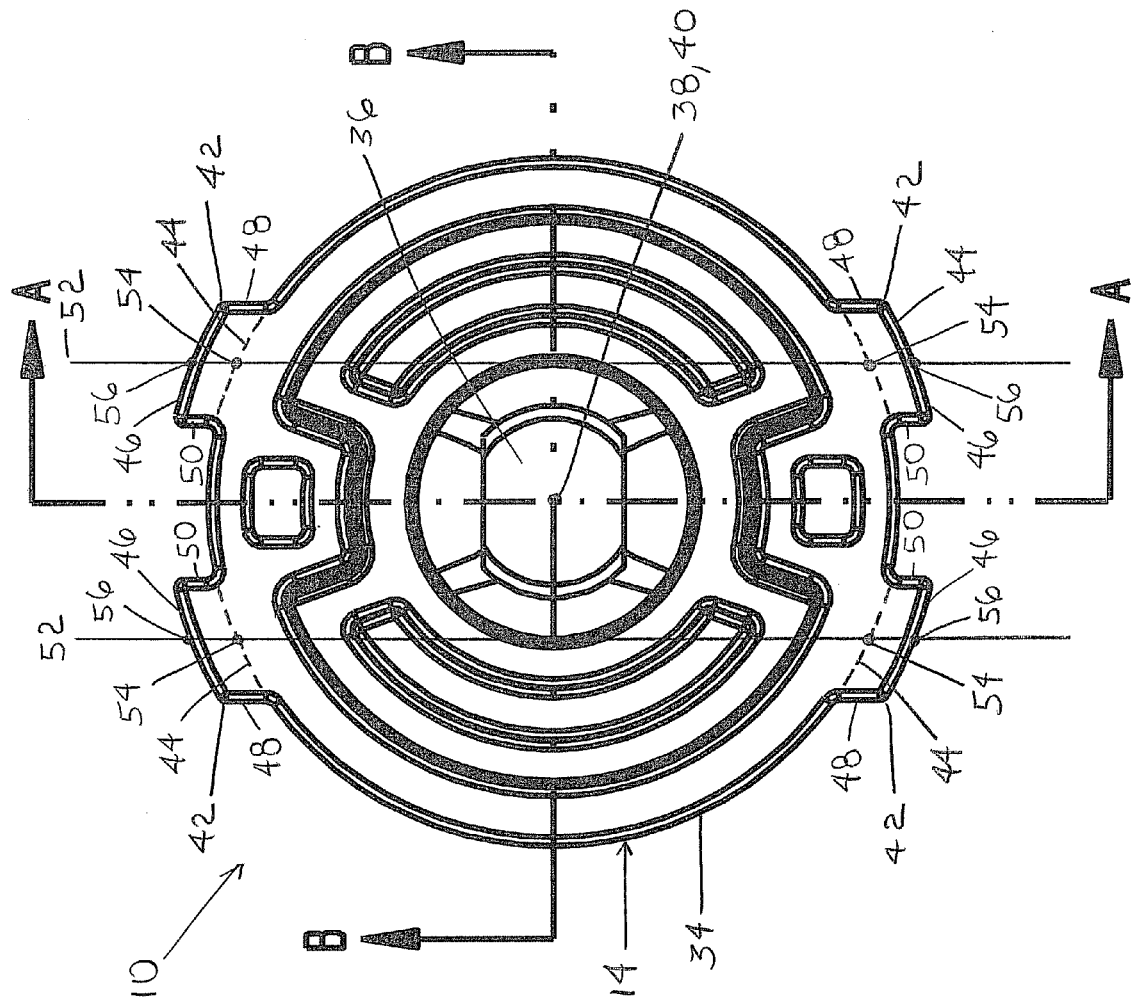
FIG. 3 is a top plan view of the cartridge assembly of FIG. 2.
Figure 4:
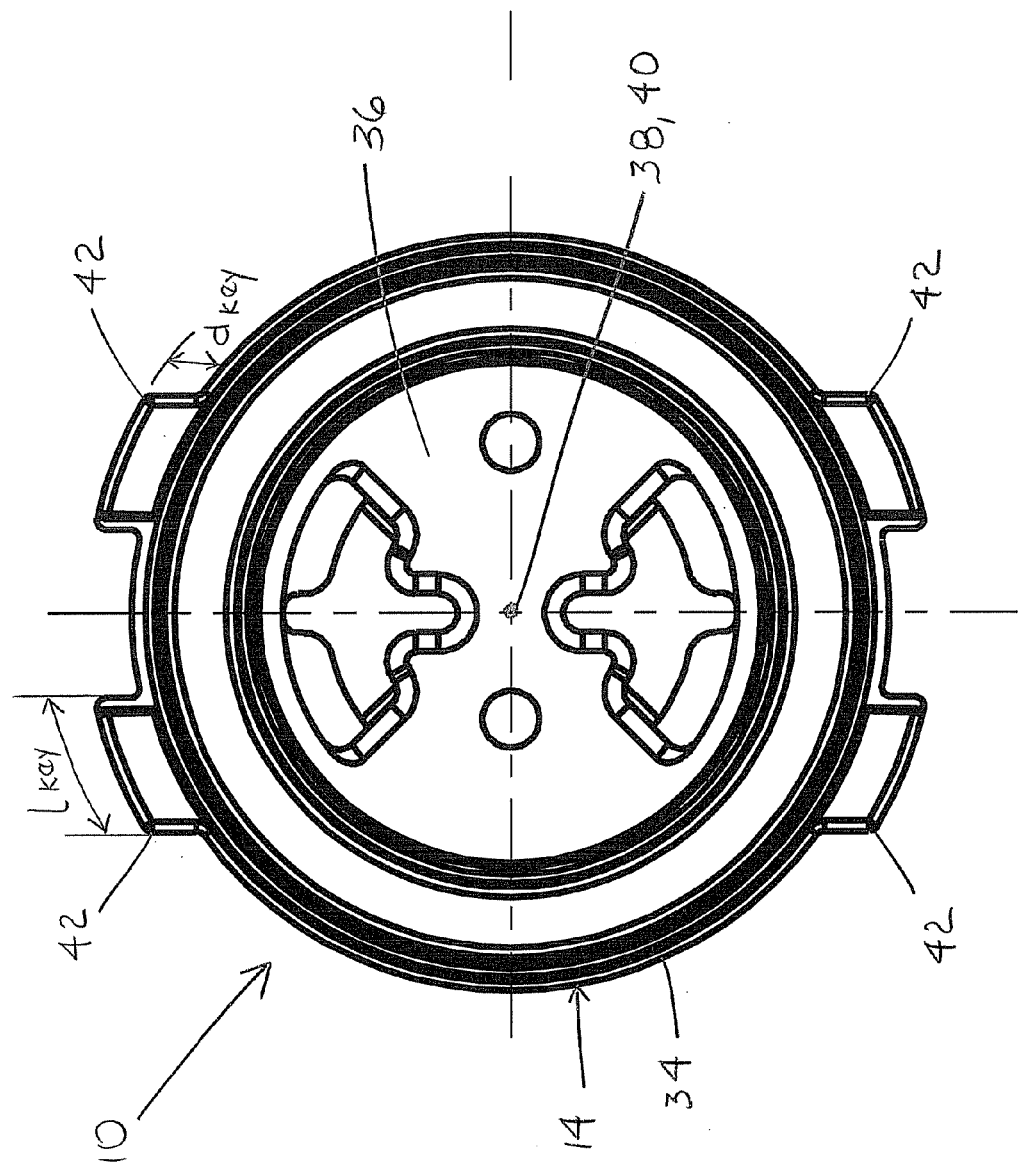
FIG. 4 is a bottom plan view of the cartridge assembly of FIG. 2.

In the illustrated embodiment, as best shown in FIGS. 3 and 4, four (4) keys 42 extend from the exterior surface 34 of the cartridge shell 14. Each key 42 can be integrally formed with the cartridge shell 14 or can be securely affixed to the cartridge shell 14. Each key 42 is generally parallelepiped shaped.

In the illustrated embodiment, each key 42 has an inner side 44 and an outer side 46. The inner side 44 of each key 42 is formed by an interface between the key 42 and the cartridge shell 14. A dashed line has been added in FIG. 3 to illustrate the inner side 44 of each key 42. Additionally, each key has a first side 48 and a second side 50. For reference purposes, the inner side 44, the outer side 46, the first side 48, and the second side 50 of each key 42 lie in a plane through the first end 30 of the cartridge shell 14 that is perpendicular to the central longitudinal axis 38 of the cartridge shell 14. The inner side 44 of each key 42 is generally parallel to the outer side 46 of each key 42. Further, the first side 48 of each key 42 is generally parallel to the second side 50 of each key 42. Each key 42 has a center line 52 extending through a center 54 of the inner side 44 of the key 42 and through a center 56 of the outer side 46 of the key 42. The center line 52 of each key 42 does not intersect the central longitudinal axis 38 of the cartridge shell 14. As a result, each key 42 is considered radially offset.

In the illustrated embodiment, a length ($l_{key}$) of each key 42, as best shown in FIG. 4, is approximately one-eighteenth of a circumference of the exterior surface 34 of the cartridge shell 14. A depth ($d_{key}$) of each key 42, as best shown in FIG. 4, is approximately one-fourteenth of a diameter of the exterior surface 34 of the cartridge shell 14. A height ($h_{key}$) of each key 42, as best shown in FIG. 5, is approximately one-fifth of a height ($h_{shell}$) of the exterior surface 34 of the cartridge shell 14. Although the dimensions of the key 42 have been generally described with reference to the dimensions of the cartridge shell 14, one of ordinary skill in the art will appreciate that the dimensions of the key 42 could vary. For example, the key 42 could extend the entire height of the cartridge shell 14.

In the illustrated embodiment, as best shown in FIG. 1, the valve body 12 includes a first end 58 and a second end 60. The valve body 12 has an exterior surface 62 with a generally cylindrical shape. The valve body 12 has an interior surface 64 with a generally cylindrical shape. The interior surface 64 of the valve body 12 generally corresponds to the exterior surface 34 of the cartridge shell 14. The valve body 12 can be a one-handle valve body or a two-handle valve body. The valve body 12 can be formed of plastic, metal, or any other suitable material.

In the illustrated embodiment, the valve body 12 includes four (4) keyways 66 for receiving the four (4) keys 42. The shape of each keyway 66 generally corresponds to the shape of each key 42. Each keyway 66 can be formed as a groove in the interior surface 64 of the valve body 12 or can be formed as a notch through the interior surface 64 and through the exterior surface 62 of the valve body 12. Each keyway 66 can be formed by broaching, machining, or any other suitable method.

During installation, the cartridge assembly 10 is inserted into the valve body 12. More specifically, the second end 32 of the cartridge shell 14 is inserted into the first end 58 of the valve body 12. The cartridge assembly 10 is further inserted into the valve body 12 until the first end 30 of the cartridge shell 14 is generally aligned with the first end 58 of the valve body 12.

During operation, the interaction of the keys 42 with the keyways 66 resists rotation of the cartridge shell 14, and thus the cartridge assembly 10, within the valve body 12. In the illustrated embodiment including four (4) keys 42 and four (4) keyways 66, with a cartridge shell 14 formed of plastic, the keys 42 can generally withstand at least one-hundred twenty (120) inch pounds of force.

Although the cartridge assembly 10 has been described as including four (4) keys 42 and the valve body 12 has been described as including four (4) keyways 66, one of ordinary skill in the art will appreciate that the cartridge assembly 10 could include more or less than four (4) keys 42 and the valve body 12 could include more or less than four (4) keyways 66. In an exemplary embodiment, the number of keyways 66 corresponds to the number of keys 42.

In one exemplary embodiment, the cartridge assembly 10 includes a single key 42 and the valve body 12 includes a single keyway 66. As a result, there is a single center line 52. The center line 52 does not intersect the central longitudinal axis 38 of the cartridge shell 14.

In another exemplary embodiment, the cartridge assembly 10 includes a pair of keys 42 and the valve body 12 includes a pair of keyways 66. In this embodiment, the keys 42 are diametrically opposed to each other, and the keyways 66 are diametrically opposed to each other. As a result, the center line 52 of one of the pair of keys 42 is common with the center line 52 of another of the pair of keys 42. The center line 52 of the pair of keys 42 does not intersect the central longitudinal axis 38 of the cartridge shell 14.

In another exemplary embodiment, the cartridge assembly 10 includes a pair of keys 42 and the valve body 12 includes a pair of keyways 66. In this embodiment, the keys 42 are diametrically offset from each other, and the keyways 66 are diametrically offset from each other. As a result, the center line 52 of one of the pair of keys 42 is parallel to the center line 52 of another of the pair of keys 42. The center lines 52 of the pair of keys 42 do not intersect the central longitudinal axis 38 of the cartridge shell 14.

In the illustrated embodiment, the cartridge assembly 10 includes two pairs of keys 42 and the valve body 12 includes two pairs of keyways 66. In this embodiment, the first pair keys 42 are diametrically opposed to each other, and the first pair keyways 66 are diametrically opposed to each other. Similarly, the second pair keys 42 are diametrically opposed to each other, and the second pair keyways 66 are diametrically opposed to each other. Further, the first pair keys 42 are diametrically offset from the second pair keys 42, and the first pair keyways 66 are diametrically offset from the second pair keyways 66. As a result, the center line 52 of one of the first pair of keys 42 is common with the center line 52 of another of the first pair of keys 42, and the center line 52 of one of the second pair of keys 42 is common with the center line 52 of another of the second pair of keys 42. Further, the center line 52 of the first pair of keys 42 is parallel to the center line 52 of the second pair of keys 42. The center line 52 of the first pair of keys 42 does not intersect the central longitudinal axis 38 of the cartridge shell 14, and the center line 52 of the second pair of keys 42 does not intersect the central longitudinal axis 38 of the cartridge shell 14.

In each embodiment, the interaction of the keys 42 with the keyways 66 resists rotation of the cartridge shell 14, and thus the cartridge assembly 10, within the valve body 12.

One of ordinary skill in the art will now appreciate that the present invention provides a cartridge assembly with a radially offset key. Although the present invention has been shown and described with reference to particular embodiments, equivalent alterations and modifications will occur to those skill in the art upon reading and understanding this specification. The present invention includes all such equivalent alterations and modifications and is limited only by the scope of the following claims in light of their full scope of equivalents.

What is claimed is:

1. A faucet including a cartridge assembly, the faucet comprising:

a cartridge shell, the cartridge shell including a first end and a second end, the cartridge shell having an exterior surface, the cartridge shell having an interior with a central longitudinal axis extending through a center of the interior from the first end to the second end; and a key extending from the exterior surface of the cartridge shell, the key having an inner side and an outer side, the inner side and the outer side of the key lying in a plane through the first end of the cartridge shell that is perpendicular to the central longitudinal axis of the cartridge shell, the key having a center line extending through a center of the inner side of the key and through a center of the outer side of the key;

wherein the center line of the key does not intersect the central longitudinal axis of the cartridge shell.

2. The faucet of claim 1, wherein the key is integrally formed with the cartridge shell.

3. The faucet of claim 1, wherein the key is generally parallelepiped shaped.

4. The faucet of claim 1, wherein a length of the key is approximately one-eighteenth of a circumference of the exterior surface of the cartridge shell.

5. The faucet of claim 1, wherein a depth of the key is approximately one-fourteenth of a diameter of the exterior surface of the cartridge shell.

6. The faucet of claim 1, wherein a height of the key is approximately one-fifth of a height of the exterior surface of the cartridge shell.

7. The faucet of claim 1, further comprising a valve body, the valve body including a first end and a second end, the valve body having an exterior surface and an interior surface, the valve body including a keyway for receiving the key.

8. The faucet of claim 7, wherein the shape of the keyway generally corresponds to the shape of the key.

9. The faucet of claim 7, wherein the keyway is a groove in the interior surface of the valve body.

10. The faucet of claim 7, wherein the keyway is a notch through the interior surface and through the exterior surface of the valve body.

11. The faucet of claim 7, wherein the interaction of the key with the keyway resists rotation of the cartridge shell within the valve body.

12. A faucet including a cartridge assembly, the faucet comprising:

a cartridge shell, the cartridge shell including a first end and a second end, the cartridge shell having an exterior surface, the cartridge shell having an interior with a central longitudinal axis extending through a center of the interior from the first end to the second end; and a pair of keys extending from the exterior surface of the cartridge shell, each key having an inner side and an outer side, the inner side and the outer side of each key lying in a plane through the first end of the cartridge shell that is perpendicular to the central longitudinal axis of the cartridge shell, each key having a center line extending through a center of the inner side of the key and through a center of the outer side of the key;

wherein the center line of each key does not intersect the central longitudinal axis of the cartridge shell.

13. The faucet of claim 12, wherein the keys are diametrically opposed to each other and the center line of one of the pair of keys is common with the center line of another of the pair of keys.

14. The faucet of claim 12, wherein the keys are diametrically offset from each other and the center line of one of the pair of keys is parallel to the center line of another of the pair of keys.

15. The faucet of claim 12, further comprising a valve body, the valve body including a first end and a second end, the valve body having an exterior surface and an interior surface, the valve body including a pair of keyways for receiving the pair of keys.

16. The faucet of claim 15, wherein the shape of the keyways generally corresponds to the shape of the keys.

17. A faucet including a cartridge assembly, the faucet comprising:

a cartridge shell, the cartridge shell including a first end and a second end, the cartridge shell having an exterior surface, the cartridge shell having an interior with a central longitudinal axis extending through a center of the interior from the first end to the second end;

a first pair of keys extending from the exterior surface of the cartridge shell, the first pair of keys being diametrically opposed to each other, each of the first pair of keys having an inner side and an outer side, the inner side and the outer side of each of the first pair of keys lying in a plane through the first end of the cartridge shell that is perpendicular to the central longitudinal axis of the cartridge shell, each of the first pair of keys having a center line extending through a center of the inner side of the key and through a center of the outer side of the key, the center line of one of the first pair of keys is common with the center line of another of the first pair of keys; and a second pair of keys extending from the exterior surface of the cartridge shell, the second pair of keys being diametrically opposed to each other, each of the second pair of keys having an inner side and an outer side, the inner side and the outer side of each of the second pair of keys lying in a plane through the first end of the cartridge shell that is perpendicular to the central longitudinal axis of the cartridge shell, each of the second pair of keys having a center line extending through a center of the inner side of the key and through a center of the outer side of the key, the center line of one of the second pair of keys is common with the center line of another of the second pair of keys;

wherein the first pair of keys are diametrically opposed to the second pair of keys;

wherein the center line of the first pair of keys is parallel to the center line of the second pair of keys;

wherein the center line of the first pair of keys does not intersect the central longitudinal axis of the cartridge shell; and wherein the center line of the second pair of keys does not intersect the central longitudinal axis of the cartridge shell.

18. The faucet of claim 17, further comprising a valve body, the valve body including a first end and a second end, the valve body having an exterior surface and an interior surface, the valve body including a first pair of keyways for receiving the first pair of keys and a second pair of keyways for receiving the second pair of keys.

19. The faucet of claim 18, wherein the shape of the keyways generally corresponds to the shape of the keys.

20. The faucet of claim 18, wherein the cartridge shell is formed of plastic and wherein the keys can generally withstand at least one-hundred twenty inch pounds of force.

* * * * *